F. C. ATKINSON.
FOOD PRODUCT AND PROCESS OF PRODUCING SAME.
APPLICATION FILED FEB. 19, 1917.
1,264,591.
Patented Apr. 30, 1918.
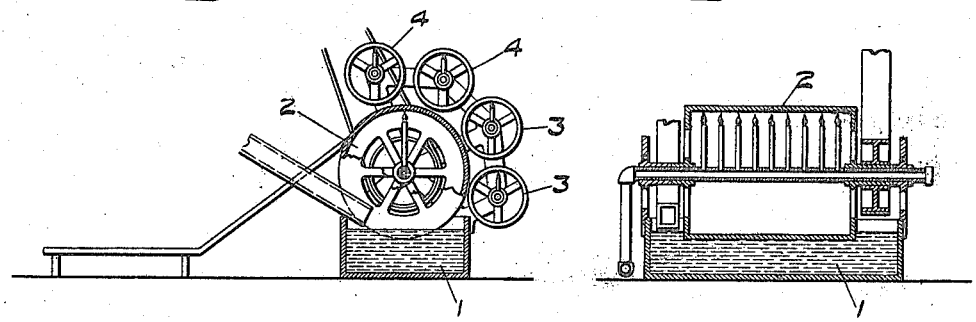
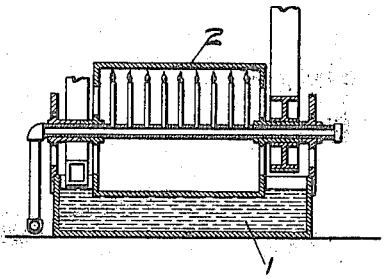
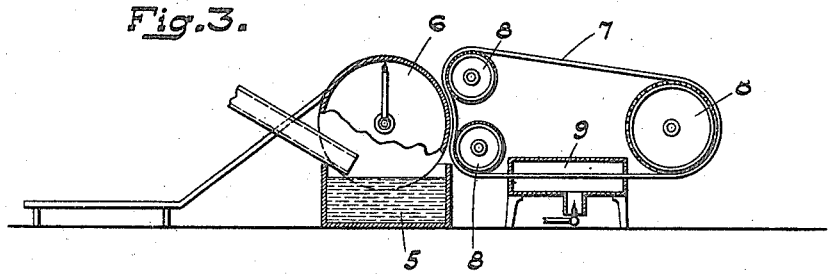
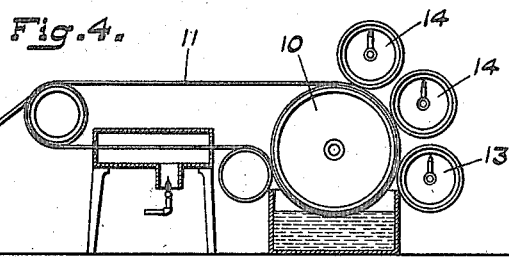
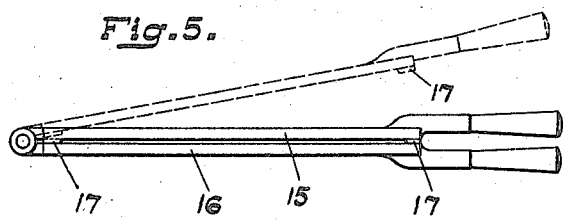
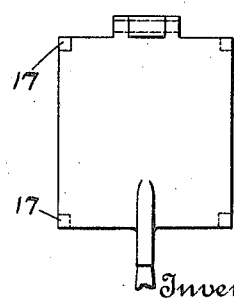

UNITED STATES PATENT OFFICE.

FREDERICK C. ATKINSON, OF INDIANAPOLIS, INDIANA.

FOOD PRODUCT AND PROCESS OF PRODUCING SAME.

1,264,591. Specification of Letters Patent. Patented Apr. 30, 1918.

Application filed February 19, 1917. Serial No. 149,659.

*To all whom it may concern:*

Be it known that I, FREDERICK C. ATKINSON, a citizen of the United States, residing at Indianapolis, Marion county, and State of Indiana, have invented and discovered certain new and useful Improvements in Food Products and Processes of Producing Same, of which the following is a specification.

My invention relates to food products and processes of preparing the same and its object is to produce a product which shall be palatable and which may be rapidly and cheaply produced in such form as may be broken into small crisp pieces capable of being readily packed into cartons or boxes.

With these objects in view, my invention consists of the product and the process of preparing the same hereinafter described.

Various forms of apparatus which may be used in carrying out the process are illustrated in the accompanying drawings. In these drawings, Figure 1 is a side diagrammatic view of a machine adapted to employ heated rollers for forming and toasting the product and a dipping trough containing the paste consisting of the cereal products or products and liquid; Fig. 2, a sectional view of the arrangement shown in Fig. 1; Fig. 3, a side diagrammatic view of an apparatus employing a toasting chain or belt in lieu of one set of rollers used in Fig. 1; Fig. 4, a similar view of another form of apparatus showing a belt differently arranged; Fig. 5, a side view of a device consisting of hinged plates for forming the sheets of material; and Fig. 6, a plan view of the plates shown in Fig. 5.

The product consists of a thin sheet of a crisply toasted composition of vegetable meal and water, or other liquid such as milk. The process consists in feeding a comparatively thin layer of the paste, formed of such meal and liquid, between heated metallic surfaces of a temperature sufficient to crisply toast the body throughout its mass. The sheet thus formed may be broken up during the process of preparation or subsequent thereto. The meal used is preferably corn meal, although a mixture of corn meal with other cereal meals or leguminous meals may be mixed with the corn meal. However, the ground vegetable produce should be of a non-glutinous consistency.

Referring to the accompanying drawings and first to the device shown in Figs. 1 and 2, 1 indicates a trough or a similar receptacle adapted to contain a paste consisting of uncooked corn meal, or other meal of a non-glutinous consistency, or a mixture of such a meal with other ground cereal or leguminous products and water or milk of such a consistency that the particles will cohere and will adhere to a metallic surface. Mounted above this trough and adapted to dip into the same so as to be coated with the paste in its revolution and carry the same along with it is a large heated cylinder or roll 2 preferably heated by steam admitted to the interior thereof. Disposed opposite to this roll and spaced the desired distance therefrom to form a sheet of material of the required thickness are rolls 3 and 4, which are also heated and which, together with the main large roll 2 are adapted to be positively driven by a suitable mechanism, such as gears. The rolls are heated to such a temperature as to toast the paste entirely throughout the same, the sheet being of such a thickness relative to this temperature as to permit the penetration of the heat through its body. As the large roll dips into the trough it will be coated with the material and will carry the same up against the small rolls 3 and 4, which will press the paste flat against the main roll and reduce the same to a sheet and at the same time the heated surfaces of the rolls will toast the paste throughout and the same will be carried up over the large roll in the form of a crisp toasted sheet which may be broken into smaller blocks or fragments after the step of forming the same or which may be indented into squares or ridges on the upper smaller roller adapted to score the sheet.

In Fig. 3 an arrangement is shown in which 5 is the dipping trough and 6 a large heated toasting and feeding roller. Adapted to coöperate with this roller is an endless metal chain 7, driven by sprocket wheels 8 and passing through a furnace 9, whereby the chain is heated to a toasting temperature. This chain is spaced slightly from the roller 6 and is adapted to serve as the complementary toasting member thereto.

In Fig. 4, an arrangement is shown in which a large drum 10 is employed as a driving member and in which one of the toasting members is provided by means of an endless metallic belt 11 adapted to pass around the drum and to also serve as a conveying device to carry the completed toasted sheet away to a suitable place of deposit. In this arrangement the belt passes under the drum 10 and dips into a trough 12 containing the material to be treated and carries such material upwardly into contact with opposing heated loose rolls 13 and 14 between which and the chain the material is compressed into a flat sheet and by which it is toasted and the belt then carries the toasted sheet back over the large drum and rearwardly to a point of delivery. This belt also passes through a heating furnace.

In Figs. 5 and 6, a compressing and toasting device is shown consisting of two flat hinged plates 15 and 16, which are spaced apart a sufficient distance to form a sheet of the desired thickness by means of corner lugs 17 on one of the plates. These plates are heated to a sufficient temperature to toast the thin sheet. In this arrangement the material must be fed in between the plates by hand and removed from the plates by means of a scraper after it has been toasted.

Having thus described my invention, what I claim is:

1. A food product consisting of a compressed, toasted paste of a ground vegetable meal of a non-glutinous consistency and an aqueous liquid.

2. A food product consisting of a mixture of corn meal and an aqueous liquid compressed, and toasted throughout.

3. A food product consisting of a non-glutinous cereal meal, a liquid, seasoning ingredients and a fat incorporated with the mixture, the product being in compressed form, toasted to browning throughout.

4. A food product consisting of corn meal and a liquid in a flat sheet-like condition toasted to browning.

5. The process which consists in compressing a paste of a vegetable meal and an aqueous liquid to cohere the same into sheets and at the same time toasting the same to brownness to produce a crisp, brittle article.

6. The process of producing a food product which consists in mixing corn meal and an aqueous liquid and feeding the paste thus formed between bodies spaced apart a slight distance and sufficiently close together to compress the paste and form a sheet thereof, and heating said bodies to a temperature sufficient to toast the sheet throughout.

In witness whereof, I have hereunto set my hand and seal at Indianapolis, Marion county, Indiana, this 25th day of January, A. D. nineteen hundred and seventeen.

FREDERICK C. ATKINSON. [L.S.]

Witnesses:
A. C. RICE,
MAUD CASTETTER.

Copies of this patent may be obtained for five cents each, by addressing the "Commissioner of Patents, Washington, D. C."